United States Patent
Kim et al.

(10) Patent No.: US 8,285,978 B2
(45) Date of Patent: Oct. 9, 2012

(54) STORAGE MEDIUM STORING MASTER BOOT RECORD, COMPUTER SYSTEM HAVING THE SAME AND BOOTING METHOD OF THE COMPUTER SYSTEM

(75) Inventors: Deok-rae Kim, Suwon-si (KR);
Keon-young Cho, Yongin-si (KR);
Kyung-young Kim, Suwon-si (KR);
Seung-lee Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 797 days.

(21) Appl. No.: 12/276,683

(22) Filed: Nov. 24, 2008

(65) Prior Publication Data
US 2009/0292912 A1    Nov. 26, 2009

(30) Foreign Application Priority Data
May 21, 2008  (KR) ........................ 10-2008-0047230

(51) Int. Cl.
*G06F 15/177*    (2006.01)
(52) U.S. Cl. ................................. 713/2; 713/1

(58) Field of Classification Search ........................ None
See application file for complete search history.

(56) References Cited

U.S. PATENT DOCUMENTS

| | | | |
|---|---|---|---|
| 6,763,458 B1 * | 7/2004 | Watanabe et al. | 713/100 |
| 2002/0083367 A1 * | 6/2002 | McBride et al. | 714/15 |
| 2004/0210848 A1 * | 10/2004 | Vineyard et al. | 715/810 |
| 2004/0255106 A1 * | 12/2004 | Rothman et al. | 713/1 |
| 2009/0089569 A1 * | 4/2009 | Baribault et al. | 713/2 |

\* cited by examiner

*Primary Examiner* — Dennis M Butler
(74) *Attorney, Agent, or Firm* — Jefferson IP Law, LLP

(57) ABSTRACT

A storage medium storing a master boot record, a computer system having the same, and a booting method of the computer system, the storage medium including: a first sector to store a first master boot record including an execution code for grasping command information and implementing a preset control according to the command information; a first data storage region to store a first data file for booting; a second sector to store a second master boot record to implement booting based on the first data file; a second data storage region to store a second data file for booting; and a third sector to store a third master boot record to implement booting based on the second data file.

26 Claims, 3 Drawing Sheets

STORAGE MEDIUM STORING MASTER BOOT RECORD, COMPUTER SYSTEM HAVING THE SAME AND BOOTING METHOD OF THE COMPUTER SYSTEM

CROSS-REFERENCE TO RELATED APPLICATION

This application claims the benefit of Korean Patent Application No. 2008-47230, filed May 21, 2008, in the Korean Intellectual Property Office, the disclosure of which is incorporated herein by reference.

BACKGROUND OF THE INVENTION

1. Field of the Invention

Aspects of the present invention relate to a storage medium storing a master boot record, a computer system having the same, and a booting method of the computer system, and more particularly to a storage medium storing a master boot record that contains a plurality of operating systems, a computer system having the same, and a booting method of the computer system.

2. Description of the Related Art

In general, a hard disk drive of a computer system (such as a personal computer, a laptop computer, a workstation, a mobile phone, a personal digital assistant, etc.) has memory addresses from a zero address to a last address, and includes one or more cylinders and a master boot record (MBR). The master boot record occupies one sector of the hard disk drive, and informs the computer system of a booting method and sector allocation with regard to each file. Furthermore, a user may add another operating system to the current operating system or add an application to the master boot record or a certain sector of the hard disk drive to use various applications such as a security solution, a recovery solution, etc. With the solution providing additional operations, the solution's own master boot record may be required.

If the master boot record for the existing operating system is different from that of a solution desired to be used, a user cannot use the solution. For example, if WINDOWS VISTA is employed as the operating system, a security program (i.e., BIT LOCKER) supported by WINDOWS VISTA is under control of the master boot record for WINDOWS VISTA only. In this case, a solution using master boot records other than the master boot record for the exclusive use of WINDOWS VISTA cannot be used together with the BIT LOCKER.

SUMMARY OF THE INVENTION

Aspects of the present invention to provide a storage medium, a computer system having the same, and a booting method of the computer system, in which different operating systems can be booted through different master boot records. Aspects of the present invention also provide a storage medium, a computer system having the same, and a booting method of the computer system, in which a recovery solution is easily executable under a WINDOWS operating system.

According to an aspect of the present invention, there is provided a storage medium implemented by at least one computer, the storage medium including: a first sector to store a first master boot record including an execution code allowing the at least one computer to grasp command information and to implement a preset control according to the grasped command information; a first data storage region to store a first data file for booting; a second sector to store a second master boot record allowing the at least one computer to boot based on the first data file; a second data storage region to store a second data file for booting; and a third sector to store a third master boot record allowing the at least one computer to boot based on the second data file.

The first data file may be a WINDOWS operating system, and the second data file may be a recovery operating system.

The first data file may be WINDOWS VISTA.

The execution code may load the third master boot record when the command information is grasped.

The first master boot record may include a partition table to implement the booting based on the first data file, the second master boot record may include a boot code to implement the booting based on the first data file, and the execution code may load the partition table from the first master boot record and the boot code from the second master boot record when the command information is not grasped.

According to another aspect of the present invention, there is provided a computer system including: a user selection unit to receive a user selection signal; a storage medium including a first data storage region to store a first operating system, and a second data storage region to store a second operating system different from the first operating system; and a controller to control the first operating system or the second operating system to be booted according to whether the user selection signal is received.

The controller may control the user selection signal to be stored as command information.

The storage medium may include a first sector to store a first master boot record including an execution code for grasping certain command information; a second sector to store a second master boot record to implement booting based on the first operating system; and a third sector to store a third master boot record to implement booting based on the second operating system.

The controller may read the first master boot record to execute the execution code.

The first operating system may be a WINDOWS operating system, and the second operating system may be a recovery operating system.

The execution code may load the third master boot record when the command information is grasped.

The first master boot record may include a partition table to implement the booting based on the first operating system, the second master boot record may include a boot code to implement the booting based on the first operating system, and the execution code may load the partition table from the first master boot record and the boot code from the second master boot record when the command information is not grasped.

The first operating system may support a security program corresponding to either of BIT LOCKER or a network switching unit.

The storage medium may include a hard disk drive.

The controller may include a basic input output system (BIOS).

According to another aspect of the present invention, there is provided a booting method of a computer system including a first operating system using a first master boot record and a second operating system using a second master boot record different from the first master boot record, the booting method including: determining whether a user selection signal is received to selectively boot either the first operating system or the second operating system; loading the first master boot record and the second master boot record selectively according to whether the user selection signal is received; and booting the first operating system or the second operating system according to the loaded master boot record.

The booting method may further include storing the user selection signal as command information.

The determining of whether a user selection signal is received may include executing a predetermined execution code to grasp the command information.

The first operating system may be a WINDOWS operating system, and the second operating system may be a recovery operating system.

The booting method may further include loading the second master boot record when the execution code grasps the command information.

The first master boot record may include a partition table and the execution code to boot the first operating system, the computer system may include a third master boot record including a boot code to boot the first operating system, and the execution code may load the partition table from the first master boot record and the boot code from the third master boot record when the command information is not grasped.

The booting method may further include booting the first operating system when the booting of the second operating system is completed.

According to yet another aspect of the present invention, there is provided a storage medium implemented by at least one computer, the storage medium including: a first data storage region to store a first data file for booting; a second data storage region to store a second data file for booting; and a sector to store a master boot record including an execution code selectively controlling the at least one computer to boot according to the first data file or the second data file.

According to still another aspect of the present invention, there is provided a booting method of a computer system including a first operating system using a first master boot record and a second operating system using a second master boot record different from the first master boot record, the booting method including: selectively loading the first master boot record or the second master boot record according to a user selection signal; and booting the first operating system or the second operating system according to the loaded master boot record.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
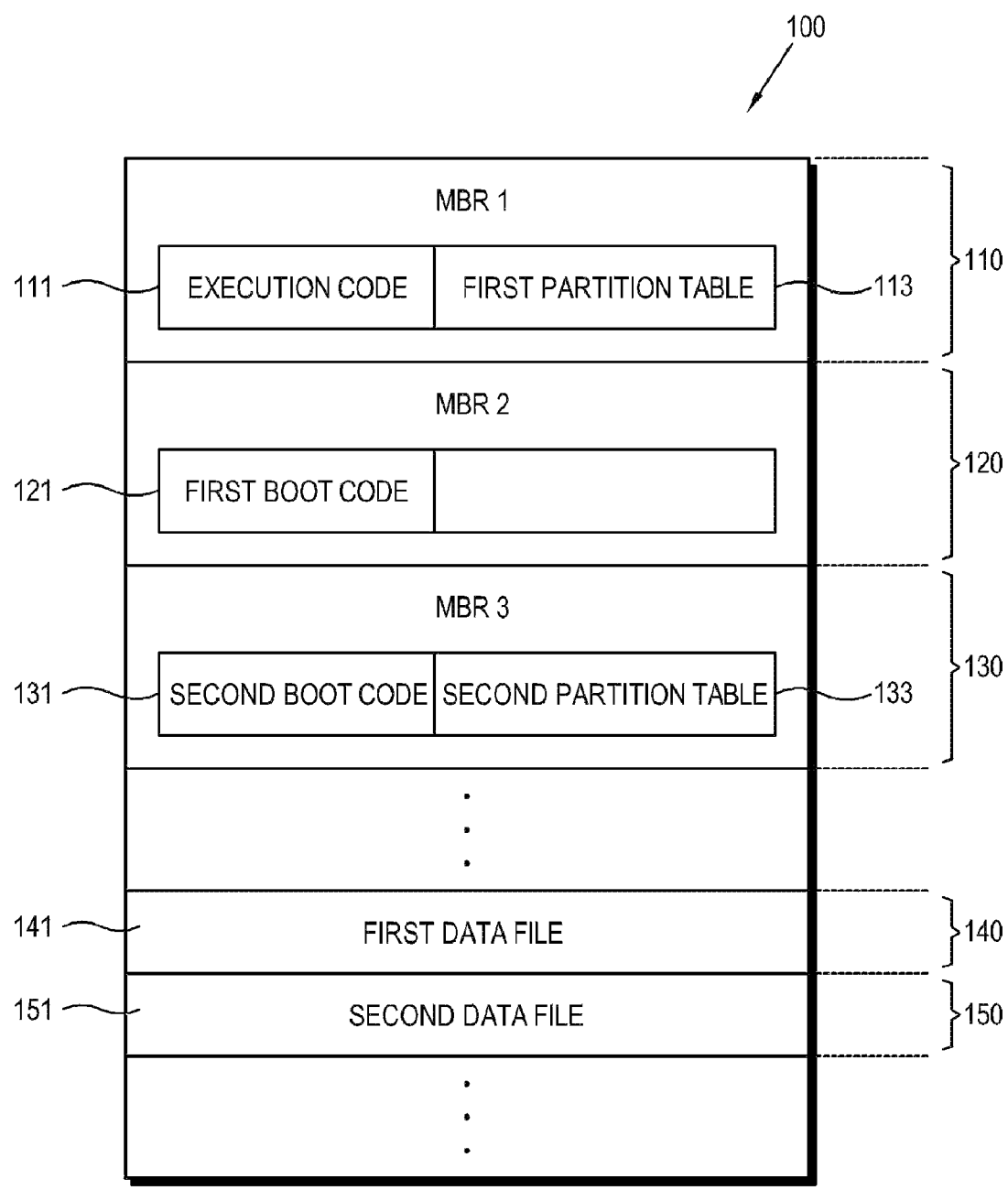
FIG. 1 is a schematic diagram of a storage medium with a master boot record according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic diagram of a storage medium 100 with a master boot record according to an embodiment of the present invention. The storage medium 100 shown in FIG. 1 is a hard disk drive of a computer system. As shown, the hard disk drive 100 is divided into a plurality of sectors 110, 120, and 130 (i.e., a storage regions), and the sectors 110, 120, and 130 respectively store different information.

Referring to FIG. 1, the storage medium 100 includes sectors 110, 120 and 130 to store the master boot records MBR 1, MBR 2 and MBR 3, respectively, and first and second data storage regions 140 and 150 to store first and second data files 141 and 151 for booting. The sector and the data storage regions are named for convenience according to data stored in the storage medium 100, but it is noted that the scopes thereof are not limited thereto.

A first sector 110 stores a first master boot record MBR 1, and the first master boot record MBR 1 includes an execution code 111 and a first partition table 113. The execution code 111 corresponds to a program that grasps certain command information. The execution code 111 is executed when the first master boot record MBR 1 is read, and grasps the command information, thereby performing a preset control based on the command information. In this embodiment, the execution code selects a master boot record to be read after the first master boot record MBR 1, such that booting is implemented according to the selected master boot record. In the first partition table 113, partition information of a first data file 141 is set to an active partition so that the booting can be implemented using the first data file 141.

A second sector 120 stores a second master boot record MBR 2, and the second master boot record MBR 2 includes a first boot code 121 that allows the booting to be implemented on the basis of the first data file 141. That is, when the booting is implemented on the basis of the first data file 141, the first partition table 113 of the first master boot record MBR 1 and the first boot code 121 of the second master boot record MBR 2 are read by the execution code 111.

A third sector 130 stores a third master boot record MBR 3, and the third master boot record MBR 3 includes a second boot code 131 and a second partition table 133. The second boot code 131 and the second partition table 133 allow the booting to be implemented according to a second data file 151. In the second partition table 133, partition information of a second data file 151 is set to an active partition so that the booting can be implemented using the second data file 151.

The first data file 141 of the first data storage region 140 may include an operating system from the MICROSOFT WINDOWS series (such as WINDOWS VISTA). The operating system controls management and allocation of resources of the computer system, and execution of application programs, thereby creating an environment that allows a user to use the computer system and storing various applications and information. The second data file 151 of the second data storage region 150 includes a different operating system from that included in the first data file 141. In this embodiment, the second data file 151 includes a recovery operating system for a recovery solution. The recovery operating system is booted using a different master boot record from that of the operating system stored in the first data storage region 140 (for example, from the WINDOWS VISTA operating system stored in the first data storage region 140). However, it is understood that aspects of the present invention are not limited thereto. For example, the second data storage region 150 may be a virtual space (i.e., logical data space) generated for the recovery operating system. In this case, the recovery operating system may be stored in an additional storage medium (e.g., an optical disk drive) physically separated from the storage medium 100.

As described, the storage medium 100 stores the plurality of operating systems, and the respective master boot records to boot up the operating systems. In this embodiment, the first master boot record MBR 1 of the storage medium 100 stores the execution code 111, as opposed to the boot code for booting. Therefore, the execution code 111 is first loaded when the booting starts to load the data from the storage medium 100. The loaded execution code 111 selects the master boot record to boot the first operating system or the second operating system. Here, the boot code, which is conventionally stored in the first master boot record MBR 1, is stored in the second master boot code MBR 2. That is, conventionally, the operating system (such as WINDOWS) was booted according to the master boot record stored in the first sector of the storage medium. On the other hand, the recovery solution, which uses the master boot record other than the master boot record stored in the first sector, cannot be booted up by the recovery operating system even though the recovery operating system is stored in the hard disk drive or the like storage media. Accordingly, the operation of the recovery solution cannot be used conventionally.

However, according to aspects of the present invention, the operating system can be selectively booted by the execution code 111 stored in the first master boot record MBR 1. Thus, the recovery solution is freely usable without colliding with the prior boot. Furthermore, the partition table 113 for the existing boot is used as is without change, and therefore there is no collision between different operating systems. Also, the independent partition table 133 for the recovery operating system is provided so that protection of the program can be improved.

The storage medium 100 may include a plurality of other data regions (not shown). Such data regions may store various system files (e.g., "io.sys," "msdos.sys," "command.com," etc.) used to boot the operating system.

The foregoing indexes and labels (MBR 2, MBR 3, second sector, third sector, etc.) are used for the mater boot records and the sectors for convenience of description, and do not limit aspects of the present invention to certain locations of the storage medium. Here, the location of the master boot record may vary according to a capacity and utility of the storage medium. For example, if the existing master boot records are stored in the first through third sectors, the second and third master boot records according to other aspects may be stored in fourth and fifth sectors, respectively.

Figure 2:
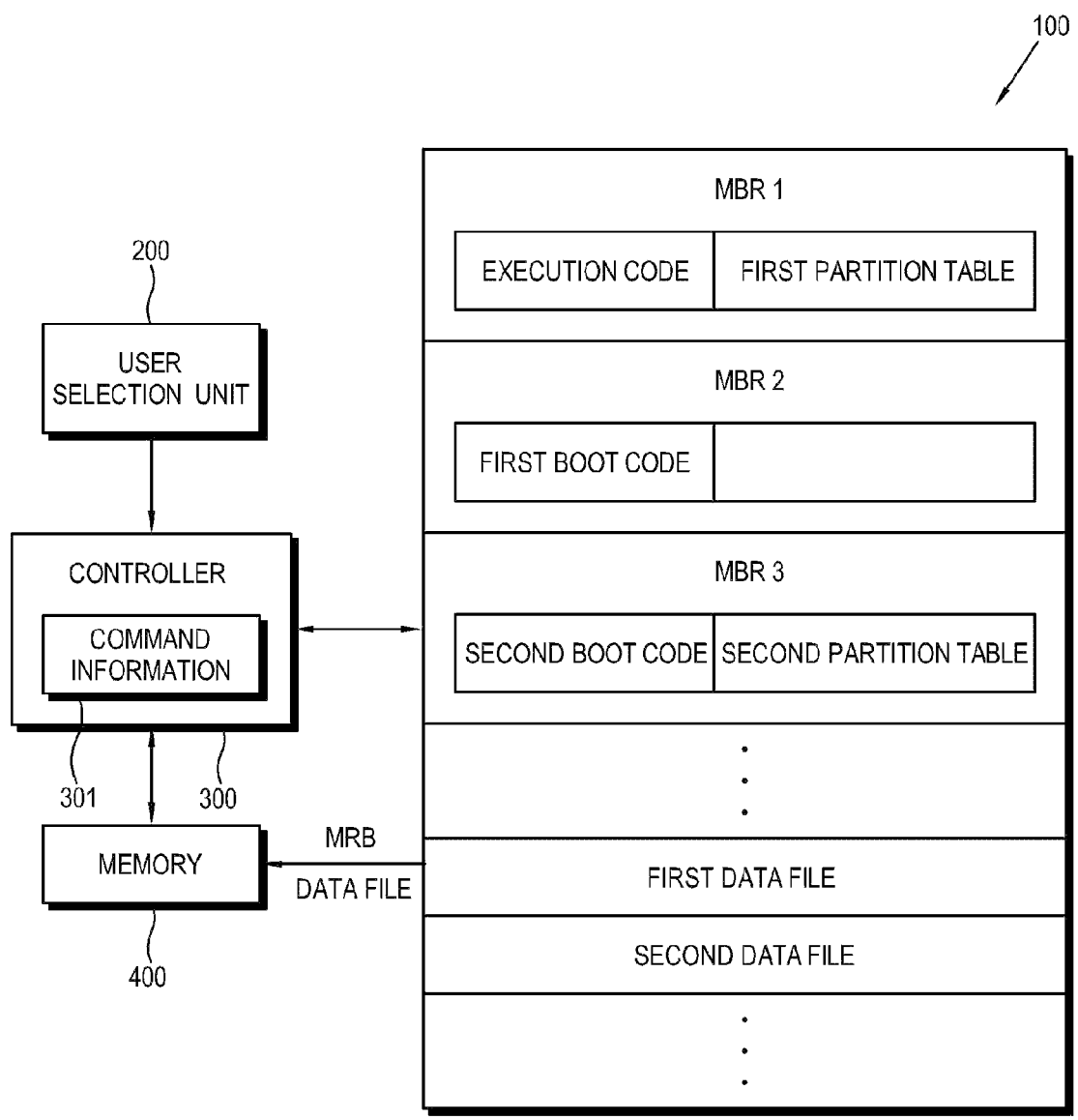
FIG. 2 is a control block diagram of a computer system according to an embodiment of the present invention, having the storage medium of FIG. 1.

FIG. 2 is a control block diagram of a computer system according to an embodiment of the present invention, having the storage medium of FIG. 1. As shown, the computer system includes the storage medium 100, a user selection unit 200, a memory 400, and a controller 300 to control the storage medium 100, the user selection unit 200, and the memory 400. The storage medium 100 illustrated in FIG. 2 is similar to the storage medium 100 illustrated in FIG. 1, and thus repetitive descriptions thereof will be avoided.

The memory 400 may be a random access memory (RAM) or the like, and stores data from the storage medium 100 and the controller 300. Hereinafter, "reading the data" and "loading the data" refer to storing certain data in the memory 400.

The user selection unit 200 is a user interface to receive a selection signal from a user. For example, the user selection unit 200 may receive the selection signal from a keyboard, a button, a mouse, a touch screen, etc., provided in the computer system. Also, the user selection unit 200 may include an electronic interface to send the controller 300 a user's selection signal generated through a physical interface. Thus, a user may either select the general operating system (such as WINDOWS VISTA) or the recovery solution to be booted up. As an example, if there is any selection signal input through the user selection unit 200, the recovery solution is booted. Otherwise (i.e., if there is no input of the selection signal), the general operating system is booted. At this time, a user may generate the selection signal by pressing a certain operation key (e.g., "F4" or "F7") of a keyboard. However, it is understood that aspects of the present invention are not limited to such a booting according to whether a user selection signal is input. For example, alternatively, the selection signals may be individually input to select the operating systems, respectively. Also, if there are three or more operating systems, three operating systems may be booted according to a predetermined booting priority or a certain operating system may be set up to be first booted.

The controller 300 controls either of the first operating system or the second operating system to be booted according to whether a user inputs the selection signal and/or according to the input selection signal. The controller 300 may be a basic input output system (BIOS), and includes a control module where a flash memory storing BIOS data and a central processing unit (not shown) communicate with each other to control the BIOS data. The controller 300 mainly controls initial booting when the computer system is turned on.

During the booting of the computer system, the BIOS data stored in the flash memory is loaded to the memory 400 after a power on self test (POST). Before starting the booting based on the BIOS, a waiting time is given to allow a user to set up the BIOS data, a boot sequence, etc. During the waiting time, a user may select a booting path. The controller 300 controls the selection signal to be stored as command information 301 when receiving the selection signal through the user selection unit 200. Here, the command information 301 may be stored in a built-in memory, a main memory, a separate memory, an external memory, etc. The command information 301 corresponds to a flag signal to inform the storage medium 100 that a user selects the booting based on the recovery solution.

After all data is loaded from a BIOS read only memory (ROM), system files are loaded from the hard disk drive. At this time, the operating system starts to be booted. The controller 300 reads the first master boot record MBR 1 from the first sector 110 of the storage medium 100 and controls the execution code 111 included in the first master boot record MBR 1 to be executed. The execution code 111 is executed to determine whether the command information 301 exists in the controller 300, and selects the next master boot record to be loaded to the memory 400 according to the command information 301.

If the command information 301 exists in the controller 300, the execution code 111 reads the third master boot record MBR 3 from the third sector 130. When the third master boot record MBR 3 is loaded, the recovery operating system stored in the second data storage region 150 is booted depending on the second boot code 131 and the second partition table 133. If the command information 301 does not exist in the controller 300, the execution code 111 reads the first partition table 113 from the first master boot record MBR 1 stored in the first sector 110 and the first boot code 121 from the second master boot record MBR 2 stored in the second sector 120.

As an example, WINDOWS VISTA supports BIT LOCKER as a security solution. BIT LOCKER should communicate with trusted platform modules (TPM) to strengthen protection of the system files before booting the operating system. Such communication is performed through the first boot code 121 provided by WINDOWS VISTA. That is, the first boot code 121 is employed for communication with the TPM when BIT LOCKER is used. In this case, it was conventionally impossible to use the recovery solution that uses its own master boot record. Further, in the case that a network switching unit is used as a security program, the network switching unit uses a certain boot code supported by WINDOWS, so that it was conventionally impossible to use the recovery solution. These problems are solved by the execution code 111 and the selection of the booting path through the execution code 111. Thus, a desired operating system can be booted without considering a collision between the operation systems.

Figure 3:
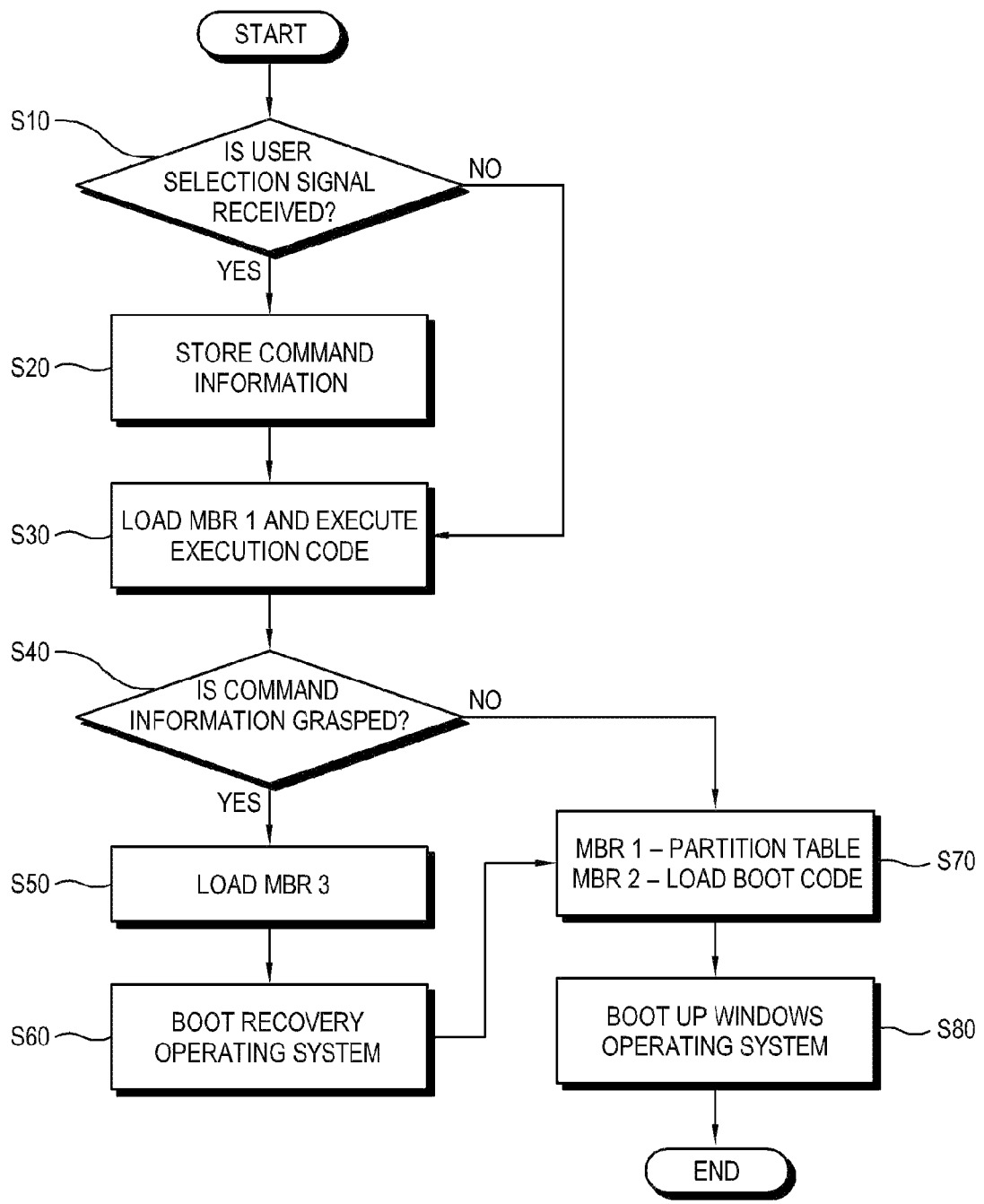
FIG. 3 is a control flowchart to explain a booting method of the computer system in FIG. 2.

FIG. 3 is a control flowchart to explain a booting method of the computer system in FIG. 2 according to an embodiment of the present invention is as follows. Referring to FIG. 3, a user inputs a selection signal to execute a recovery solution before the booting is implemented by the controller 300 in operation S10. If the user inputs the selection signal through the user selection unit 200 (operation S10), the controller 300 controls the selection signal to be stored as the command information 301 in operation S20.

If there is no input of the selection signal (operation S10) or after the command information 301 is stored, the controller 300 loads the first master boot record MBR 1 from the first sector 110 of the storage medium 100 and executes the execution code to start booting the operating system in operation S30.

The execution code 111 is executed and determines whether there the command information 301 is stored in operation S40. If the command information 301 is stored due to the selection signal from a user (operation S20), the execution code 111 loads the third master boot record MBR 3 from the third sector 130 to thereby run the recovery solution in operation S50. When the second boot code 131 and the second partition table 133 are read from the third master boot record MBR 3, the recovery operating system from the second data storage region 150 is booted and, thus, the recovery solution is run in operation S60.

On the other hand, if there is no command information 301, the execution code 111 reads the first partition table 113 from the first master boot record MBR 1 and the first boot code 121 from the second master boot record MBR 2, thereby forming a new master boot record in operation S70. Then, the operating system stored in the first data storage region 140 (for example, a WINDOWS operating system) is booted according to the new master boot record in operation S80. If the recovery operating system is completely booted, the operations (operations S70 and S80) for booting the first operating system proceed automatically. However, it is understood that aspects of the present invention are not limited thereto. For example, alternatively, if the booting of the recovery operating system is completed, a user may select whether to boot the first operating system. In this case, the computer system may display user interface (UI) information to check whether a user wants to reboot. Here, a user may selectively reboot or shut down the computer system.

It is understood that the first operating system is not limited to WINDOWS, and may include Linux, Unix or the like, and the second operating system is not limited to the recovery operating system. Aspects of the present invention addresses a problem that a separate operation cannot be run when selected before a general booting because a master boot record is not shared. In other words, aspects of the preset invention are not limited to a certain operating system and are applied to various operating systems that do not share one master boot record (i.e., respectively use different master boot records).

As described above, aspects of the present invention provide a storage medium, a computer system having the same, and a booting method of the computer system, in which different operating systems booted through different master boot records are usable. Furthermore, aspects of the present invention provide a storage medium, a computer system having the same, and a booting method of the computer system, in which a recovery solution is easily executable under an operating system such as WINDOWS. Also, aspects of the present invention provide a storage medium, a computer system having the same, and a booting method of the computer system, in which a recovery solution is easily executable while using a network switching unit.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A storage medium implemented by at least one computer, the storage medium comprising:
   a first sector storing a first master boot record comprising:
      an execution code allowing the at least one computer to grasp command information and to implement a preset control according to the grasped command information; and
      a first partition table to allow the at least one computer to boot based on a first data file, the first partition table being set as partition information of the first data file and being set as a first active partition of the storage medium;
   a first data storage region storing the first data file for booting;
   a second sector storing a second master boot record including a first boot code allowing the at least one computer to boot based on the first data file;
   a second data storage region storing a second data file for booting; and
   a third sector comprising:
      a third master boot record allowing the at least one computer to boot based on the second data file; and
      a second partition table to allow the at least one computer to boot based on a second data file, the second partition table being set as partition information of the second data file and being set as a second active partition of the storage medium.

2. The storage medium as claimed in claim 1, wherein the first data file comprises a WINDOWS operating system, and the second data file comprises a recovery operating system.

3. The storage medium as claimed in claim 2, wherein the first data file comprises WINDOWS VISTA.

4. The storage medium as claimed in claim 1, wherein the execution code controls the at least one computer to load the third master boot record when the command information is grasped.

5. The storage medium as claimed in claim 1, wherein the execution code controls the at least one computer to load the first partition table from the first master boot record and the first boot code from the second master boot record when the command information is not grasped.

6. The storage medium as claimed in claim 1, wherein the preset control loads the second master boot record or the third master boot record according to the grasped command information.

7. The storage medium as claimed in claim 1, wherein the command information controls the at least one computer to load the second master boot record or the third master boot record according to a selection signal received from a user to select between the first data file and the second data file.

8. A computer system comprising:
a user selection unit to receive a user selection signal; and
a storage medium comprising:
a first data storage region storing a first operating system,
a second data storage region storing a second operating system different from the first operating system,
a first sector storing a first master boot record including an execution code to allow a controller to grasp command information and a first partition table to allow booting based on the first operating system, the first partition table being set as partition information of the first operating system and being set as a first active partition of the storage medium,
a second sector storing a second master boot record including a first boot code to implement booting based on the first operating system, and
a third sector storing a third master boot record to implement booting based on the second operating system and a second partition table to allow booting based on the second operating system, the second partition table being set as partition information of the second operating system and being set as a second active partition of the storage medium,
wherein the controller selectively controls the first operating system or the second operating system to be booted according to the user selection signal.

9. The computer system as claimed in claim 8, wherein the controller controls the user selection signal to be stored as command information.

10. The computer system as claimed in claim 8, wherein the controller reads the first master boot record to execute the execution code.

11. The computer system as claimed in claim 8, wherein the first operating system is a WINDOWS operating system, and the second operating system is a recovery operating system.

12. The computer system as claimed in claim 8, wherein the controller loads the third master boot record according to the execution code when the command information is grasped.

13. The computer system as claimed in claim 8, wherein:
the first master boot record comprises a first partition table to implement the booting based on the first operating system;
the second master boot record comprises a first boot code to implement the booting based on the first operating system; and
the controller to load the first partition table from the first master boot record and the first boot code from the second master boot record according to the execution code when the command information is not grasped.

14. The computer system as claimed in claim 8, wherein the first operating system supports a security program corresponding to BIT LOCKER or a network switching unit.

15. The computer system as claimed in claim 8, wherein the storage medium comprises a hard disk drive.

16. The computer system as claimed in claim 8, wherein the controller comprises a basic input output system (BIOS).

17. The computer system as claimed in claim 8, wherein the controller controls the first operating system to automatically boot after the second operating system is completely booted.

18. The computer system as claimed in claim 8, wherein the controller controls the first operating system to boot or a shutdown, according to a user selection, after the second operating system is completely booted.

19. A booting method of a computer system comprising a first operating system using a first master boot record and a second operating system using a second master boot record different from the first master boot record, the booting method comprising:
determining whether a user selection signal is received for selectively booting either the first operating system or the second operating system;
selectively loading the first master boot record or the second master boot record according to whether the user selection signal is received; and
booting the first operating system or the second operating system according to the loaded master boot record,
wherein the first master boot record includes a first partition table and an execution code to boot the first operating system, the first partition table being set as partition information of the first operating system and being set as a first active partition of the storage medium,
wherein the second master boot record includes a first boot code to boot the second operating system, and
wherein the computer system comprises a third master boot record including a second boot code to boot the first operating system and a second partition table to boot the first operating system, the second partition table being set as partition information of the second operating system and being set as a second active partition.

20. The booting method as claimed in claim 19, further comprising storing the user selection signal as command information.

21. The booting method as claimed in claim 20, wherein the determining of whether the user selection signal is received comprises executing a predetermined execution code to grasp the command information.

22. The booting method as claimed in claim 19, wherein the first operating system is a WINDOWS operating system, and the second operating system is a recovery operating system.

23. The booting method as claimed in claim 21, further comprising loading the second master boot record when the execution code grasps the command information.

24. The booting method as claimed in claim 21, wherein the execution code loads the first partition table from the first master boot record and the boot code from the third master boot record when the command information is not grasped.

25. The booting method as claimed in claim 19, further comprising booting the first operating system when the booting of the second operating system is completed.

26. The booting method as claimed in claim 21, further comprising loading the first master boot record when the execution code does not grasp the command information.

* * * * *